United States Patent [19]
Knez

[11] 3,993,187
[45] Nov. 23, 1976

[54] METHOD AND APPARATUS FOR TURNING STACKABLE CUPS TO A STACKING POSITION

[75] Inventor: Jordan Knez, Halmstad, Sweden

[73] Assignee: Duni Bila AB, Halmstad, Sweden

[22] Filed: May 14, 1975

[21] Appl. No.: 577,227

[30] Foreign Application Priority Data
May 28, 1974  Sweden .............................. 7407033

[52] U.S. Cl. ............................... 198/382; 198/399; 198/403; 198/416
[51] Int. Cl.² ........................................ B65G 47/24
[58] Field of Search ............ 198/248, 249, 252–257, 198/261, 263, 268, 276, 282–285, 287, 288; 214/6.5

[56] References Cited
UNITED STATES PATENTS

| | | | |
|---|---|---|---|
| 2,586,523 | 2/1952 | Dudley, Jr. ........................ | 198/249 |
| 2,684,147 | 7/1954 | Holstebro ........................... | 198/252 |
| 2,941,654 | 6/1960 | Falconer ............................ | 198/161 X |
| 3,065,841 | 11/1962 | Stover ............................... | 198/288 X |
| 3,086,822 | 4/1963 | Fibish ............................... | 198/253 X |
| 3,198,310 | 8/1965 | Valentyne .......................... | 198/285 |
| 3,269,512 | 8/1966 | Chytil .............................. | 198/283 |
| 3,361,246 | 1/1968 | Kukawski ........................... | 198/255 |
| 3,439,792 | 4/1969 | Frank et al. ....................... | 198/249 |
| 3,498,443 | 3/1970 | Weber ............................... | 198/276 X |
| 3,623,593 | 11/1971 | Van Melle .......................... | 198/253 |

FOREIGN PATENTS OR APPLICATIONS
416,438  1/1967  Switzerland ........................ 198/282

*Primary Examiner*—Johnny D. Cherry
*Assistant Examiner*—Richard K. Thomson

[57] ABSTRACT

A method of turning a plurality of stackable cups to a position where the cups repose on their open and wider ends, the cups having a height which is less than the greatest diameter of the cups at their open ends, in which the cups are taken to a first zone on a continuously forwardly driven conveyor belt randomly assuming a position reposing on their bottom ends, reposing on their open ends or lying on one side. The cups are then moved through a second zone where those cups which are lying on one side are raised to a position where they repose on their open ends. Next, the cups are moved through a third zone where those cups reposing on their bottom ends are tipped over to a position where they repose their open ends. Finally, the cups are collected into a row and arranged after each other and led to a zone where the cups not reposing with their open ends on the belt are removed from the belt, whereafter the cups reposing on their open ends are led in a row to a position for stacking. The invention also relates to an apparatus for carrying out the method.

21 Claims, 22 Drawing Figures

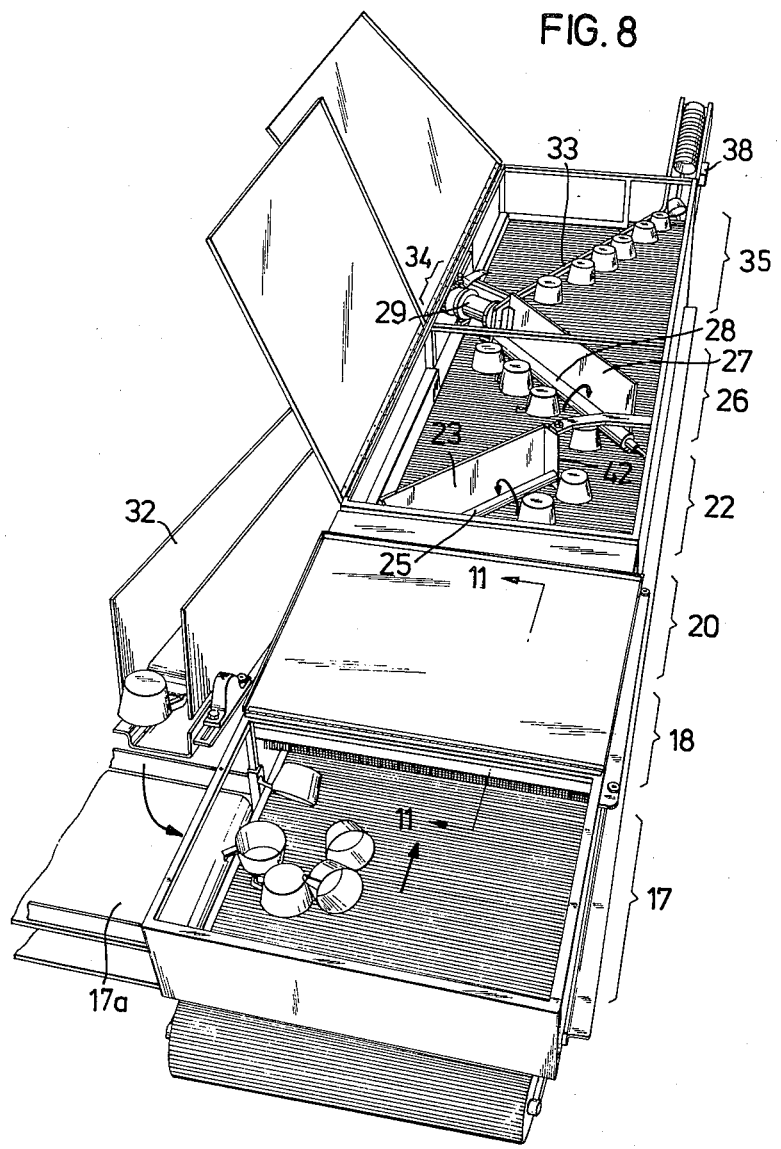

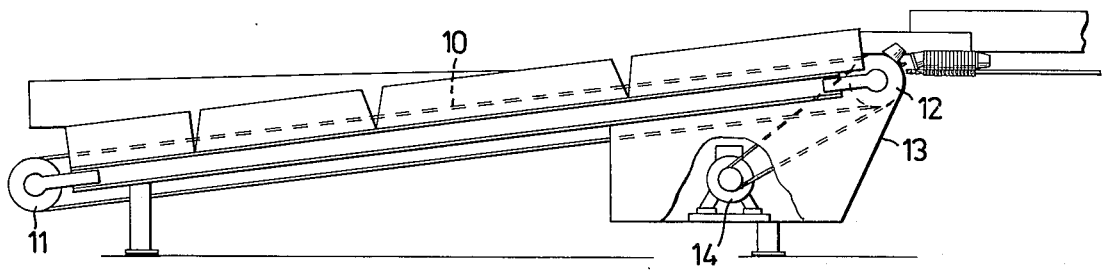
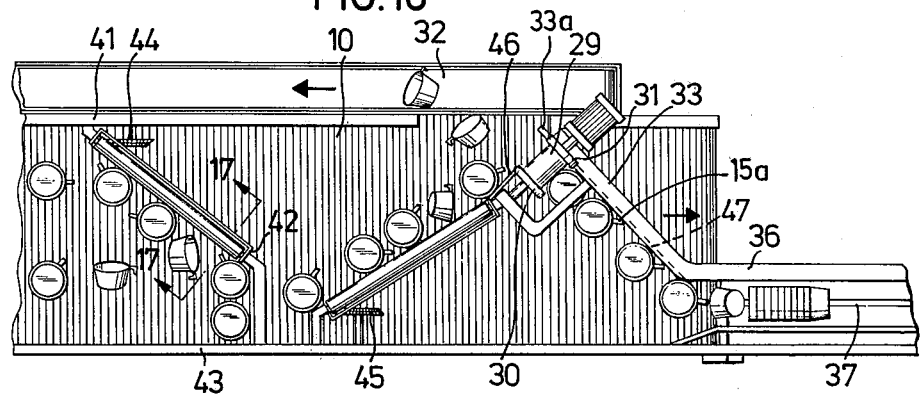
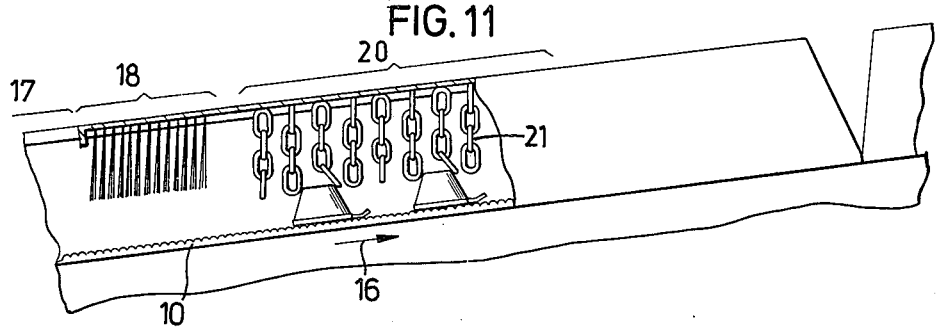

METHOD AND APPARATUS FOR TURNING STACKABLE CUPS TO A STACKING POSITION

BACKGROUND OF THE INVENTION

The present invention relates to a method and apparatus for turning stackable cups to a stackable position, especially to comparatively shallow cups, the height of which is less than the greatest diameter of the cup at the open end, which is wider in relation to the bottom end. With the type of cups which is primarily intended, the height of the cup lies within the range of about one half to about three quarters of said greatest diameter.

The cups in question may be made with or without a handle.

In the manufacture of plastic cups by injection moulding, the completed cups are fed onto a collecting table, where most of the cups assume one of the main positions: resting on the bottom end, resting on the open end or lying on one side. Further positions can occur, where for example two cups lie on top of each other, or when the cups are provided with handles, are connected together by the handle of one cup lying for example under the edge of another cup. In the case where the cups are not made with handles there is a known method for righting the cups by guiding them in between two conveyor belts on edge and having a distance between their upper edges less than the overall diameter of the cup, causing the cups to be suspended at the edges of the belts. At the further end of the belts, the righted cups are fed to a stacking device. However, this known method is not suitable for cups provided with handles. Such cups provided with handles must therefore be picked manually from the collecting table and stacked into each other by hand to a stack having the desired number of cups, which normally requires the work of two people.

BRIEF DESCRIPTION OF THE INVENTION AND OBJECTS

Against the background of prior art, it is the purpose of the invention to provide a new method and a new apparatus which can be used both for cups with handles and cups without handles, and enabling a comparatively high feeding capacity to be attained.

The invention is based on the knowledge that most of the cups lying on the collecting table assume one of the three main positions mentioned, while a comparatively large number of cups, usually in the order of magnitude of a quarter or more of the total number of cups fed onto it, assume a position lying on one side when they fall onto the collecting table. Against the background of this situation, a method and an apparatus with the characterizing features defined in the following patent claims are proposed according to the invention.

According to the invention the cups are allowed to fall on a continuously driven conveying path in the form of a belt conveyor, on which the cups randomly assume an arbitrary position, in general one of the three main positions, in a first zone along the conveying path. Thereafter the cups are fed through a second zone which is provided with means adapted only to affect cups lying on their sides to raise these into a position where they are reposing on their open ends. Cups resting either on their bottom ends or on their open ends pass freely through this zone. Due to this, the raising devices may be especially designed for effectively looking after cups on their sides without bothering with other positions of the cups, which makes it possible to provide effective raising, allowing for practically all of the cups lying separate from each other to be raised into the desired position. Feed speed can therefore be kept comparatively high in the raising zone. According to the invention, the cups are then fed into a third zone having means which are only intended to tip the cups resting on their bottom ends, the tipping means being adapted to tip the cups over to a position where they rest on their open ends. Since these means have the task of only tipping over cups having a certain position, to wit, reposing on their bottom ends, turning them to a position where they rest on the open end is enabled for practically all the cups resting on their bottom ends whereby the feed rate in this zone can be kept relatively high as well. The cups already reposing on their open ends in the first zone will not be affected by the mechanism in the third zone and will therefore retain their position.

When the cups leave the two zones defined by the invention substantially all cups will be reposing on their open ends, which means that the few cups which have other positions can be quickly screened off in a rejecting apparatus lying after the first and second zones and which is adapted to let through only those cups reposing freely on their open ends. If required, the cups can be exposed to further means striving to tip the cups reposing on their bottom ends so that they repose on their open ends, after the third zone in front of the rejecting device.

Since the cups are thus led through two zones having means which only affect a cup reposing in a certain position in the respective zone, for turning it to a position reposing on the open end, turning the different cups can be carried out effectively, allowing high feeding capacity. Furthermore, the method according to the invention is independent of whether the cups are made with handles or not, which in its turn increases the field of use for the method and apparatus.

The method and apparatus according to the invention are primarily intended for plastic cups manufactured by injection moulding, but can also be used for shallow cups of the kind in question, manufactured in a different manner.

Since the cups are to be stackable, they have a bottom end which is narrower than the open end of the cup. The generatrix of the cup between the bottom and the open end can be for example an essentially straight line or an arcuate line which is without shoulders or with shoulders, e.g. a shoulder known per se approximately at the middle of the generatrix.

BRIEF DESCRIPTION OF THE FIGURES

These and other distinguishing features and advantages of the invention will now be more closely described while referring to the attached drawings whereon an apparatus is shown as an example for carrying out the method according to the invention.

FIG. 8 is a schematic perspective view of the apparatus according to the invention with two covers raised to show the nature of certain zones of the apparatus.

FIG. 9 is a side view of the apparatus in FIG. 8.

FIG. 10 is a plan view of a portion of the apparatus in FIG. 8.

FIG. 11 is an enlarged fragmentary side view of a portion of the apparatus in FIG. 9.

DETAILED DESCRIPTION OF THE INVENTION

Figure 1:
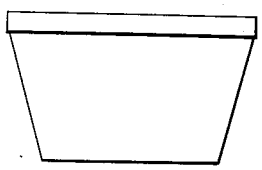
FIG. 1 shows an example of a cup which can be raised or tipped according to the invention in the apparatus shown as an example.
Figure 2:
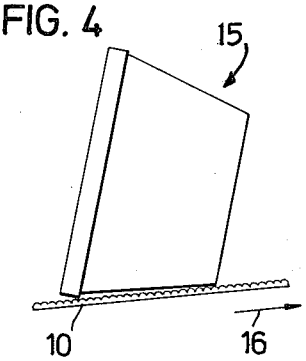
FIG. 2 is a view from above of the body in FIG. 1, a handle being drawn in with chain-dotted lines to indicate that the body can alternatively be made with or without a handle.
Figure 3:
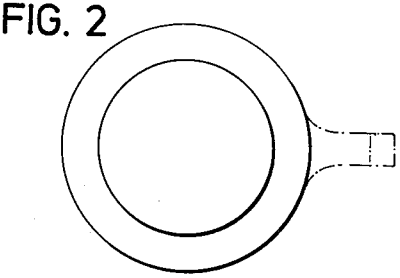
FIG. 3 shows the body in FIG. 1 with a handle and stacked in another cup shown in chain dotted lines.

In the drawings, especially FIG. 9, there is shown an endless conveyor belt with an upper part 10 which runs over two rollers 11, 12 mounted in a stand 13, the belt being driven by a motor 14. In the example illustrated, the conveyor belt inclines upwardly in the direction of movement but it can also be essentially horizontal. The upwardly inclined position is, however, preferred, since it causes a stackable, substantially conical cup 15 of the kind shown in FIG. 4 automatically to turn its bottom end in the direction of movement 16 of the conveyor, something which is an advantage for reasons to be seen below.

Figure 4:
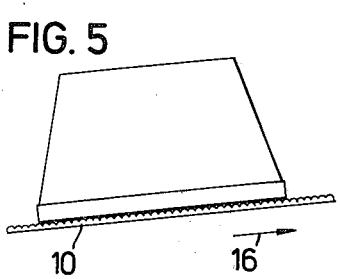
FIG. 4 shows the cup in FIG. 1 in a position where it is lying on its side on a sloping conveyor belt.
Figure 5:
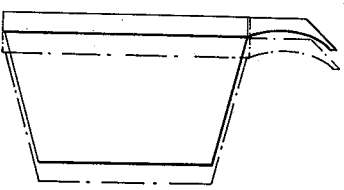
FIG. 5 shows the cup in FIG. 1 reposing on its open end on a sloping conveyor belt.
Figure 6:
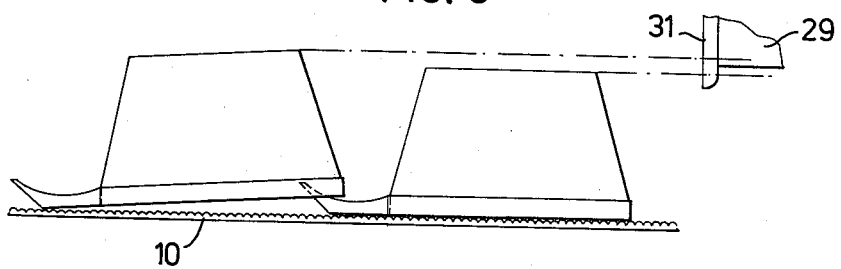
FIG. 6 shows two cups with handles in a position where the one cup has hooked onto the handle of the other cup.
Figure 7:
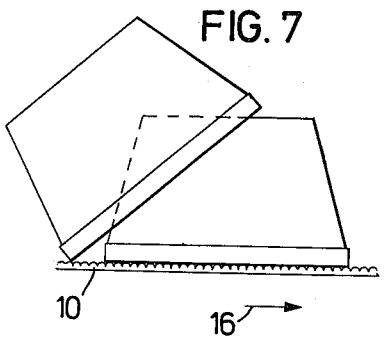
FIG. 7 shows a cup riding on another cup.

The conveyor belt goes through a number of zones (FIGS. 8, 11) where the cups are subjected to different forms of treatment. From a moulding machine such as an injection moulding machine for example, the cups roll down on a chute 17a to the first zone 17. The cups should be supplied so that they are spread out as evenly as possible on the conveyor belt in the first zone. Most of the cups assume one of three main positions in the first zone, namely: reposing on the bottom end (FIG 1) reposing on the open end (FIG. 5) or a position lying on one side (FIG. 4). Other positions can also occur even if they are not desirable (FIG. 6, 7).

Figure 12:
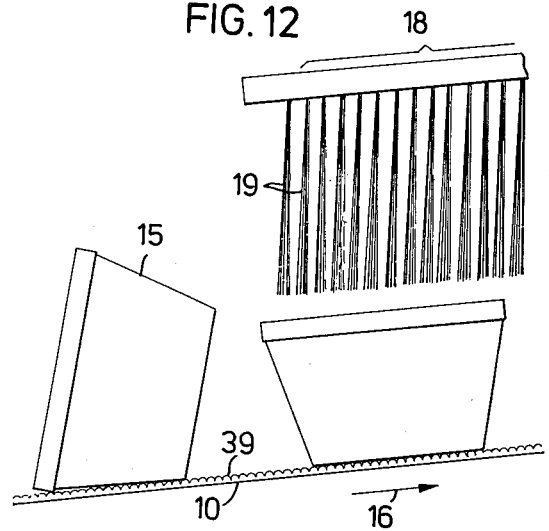
FIG. 12 is an enlarged partial view of a portion of FIG. 11 and shows the raising means in the second zone.

After the first zone, the cups are introduced into a second zone 18 provided with lifting means which in the example shown consist of a large number of bristles 19 (FIG. 12).

The cups are thereafter introduced into a third zone 20 with tipping means which constitute dependent chains 21 in the illustrated example.

Figure 18:
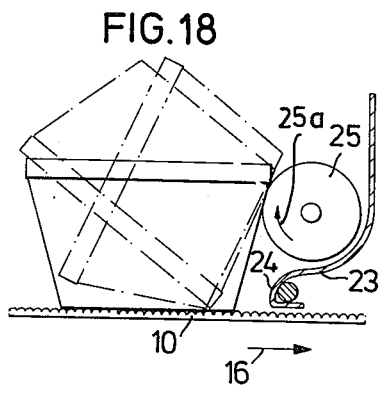
FIG. 18 shows the same apparatus as in FIG. 17 with a cup reposing on its bottom end, the side of the cup coming into contact with the rotating roller due to the movement at the belt, the intention being that cups are turned over by the roller to a position reposing on the open end.
Figure 19:
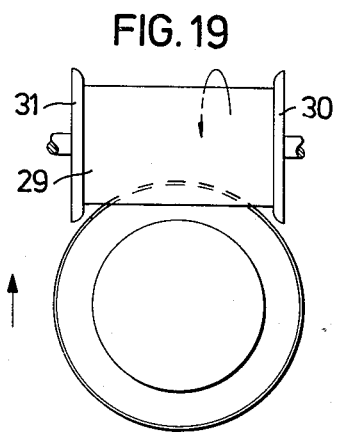
FIG. 19 is a view from above of rejecting apparatus in the shape of rotating roller with end flanges, a cup reposing on its bottom end in the position in front of the roller but unable to pass between the flanges.

After the third zone most of the cups emerge in a position reposing on the open end, and are spread out over the width of the conveyor belt. In order that as many cups as possible may be arranged after each other in a row while retaining a comparatively high feed speed on the conveyor belt, the cups are led to a fourth zone 22 which has guiding means 23 arranged obliquely to the longitudinal direction of conveyor belt with an extended edge 24 and a rotating roller 25 situated above it, the direction of rotation of which is indicated by the arrow 25a. The roller serves as tipping means for tipping cups to a position where they repose on their open end as shown in FIG. 18.

Since the said guiding means 23 in the fourth zone usually does not manage to arrange all the cups in a row after each other, the cups are passed into a fifth zone 26, arranged with a further oblique guiding means 27, which is oblique in the opposite direction in relation to the first guiding means 23, and which has an abutment edge similar to the edge 24. The guiding means coacts with a further tipping means in the form of a rotating roller 28 of the same design and arrangement as the roller 25.

When the cups leave the second guiding means 27, they are guided into a sixth zone 34 in front of a rejection apparatus in the form of a rotating roller 29 with edge flanges 30, 31. Only cups reposing freely on their open ends can pass by the first flange and under the roller between both the flanges. Cups which are hooked onto each other, when it is a question of cups with handles, or cups riding on each other, or in exceptional cases, cups which still are in a lying position or in another incorrect position, knock against at least the first flange or against the roller and are thereby driven out to the side of the conveyor, where the rejected cups fall, for example, in a return trough 32 which returns the rejected cups to the first zone 17 on the conveyor belt.

After the rejecting apparatus there are only cups which repose with the open end on the conveyor belts, and are kept in a line and arranged after each other by their rolling against an obliquely arranged guiding rail 33 in a seventh zone 35. The guiding rail 33 extends from the rejecting apparatus at one side of the belt and obliquely over the belt to the delivery end of the belt, as shown in FIGS. 8 and 10, and it is at such an angle relative to the direction of movement of the belt that the cups roll against its edge. If the cups are provided with handles, the cups will roll against the guiding rail until the handles are turned forwards and abut the guiding rail.

The guiding rail 33 delivers the cups to the farther end of the conveyor belt, where the cups fall down with the handles 15a (FIG. 10) turned downwards, into a trough 36 with a slit 37 at its bottom for lining up the handles with each other before they are fed into a stacking tube. A counter 38 senses the number of cups and when the desired number of cups is in the trough or the pipe, a gripper is entered into the stack and separates a stack with the desired number of cups.

The conveyor belt 10 has a surface which provides the desired friction for the cups to be engaged by the belt on turning from one position to another according to the above. To increase friction, the surface of the belt consists of a rubber-like material provided with transverse corrugations which form close ridges 39 as indicated in FIG. 12, for example.

Since the belt is inclined upwardly as seen in FIG. 12, the cups 15, in a lying position have a tendency to roll over on the belt to turn the bottom end in a direction towards the raising means 19 in the second zone as illustrated in FIG. 12. Even if the conveyor 10 is essentially horizontal, the cups lying in the first zone will have a tendency to turn the bottom end towards the brush 19.

The raising means or brush bristles 19 has relatively long and easily deflected bristles for bending gently towards the upwardly turned portion of the lying cup 15 and the edge of the bottom end of the cup. Since friction against the conveyor belt prevents the cup from sliding along the belt the bristles will raise the cup to a position where it is reposing on the open end, where the bristles can no longer affect the cup. In certain cases it may occur that the cup has its open end facing the brush, and in that case the cup is normally tipped to a position where it reposes on its bottom end. Especially with a sloping conveyor, this case occurs considerably less than the case with the cup having the bottom end facing the brush.

In the third zone with the tipping means or chains 21, the chains have a length which locates the lowest element or chain link 40 at a level with the upper end portion of the cup, the lower end of the chain suitably being in a level range which lies between half the height of the cup and three quarters of this height.

Figure 13:
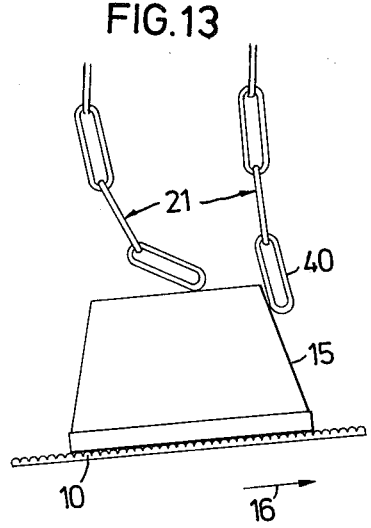
FIG. 13 shows how the tipping means in the third zone glides over a cup which is reposing on its open end and is not tipped over by the tipping elements.
Figure 14:
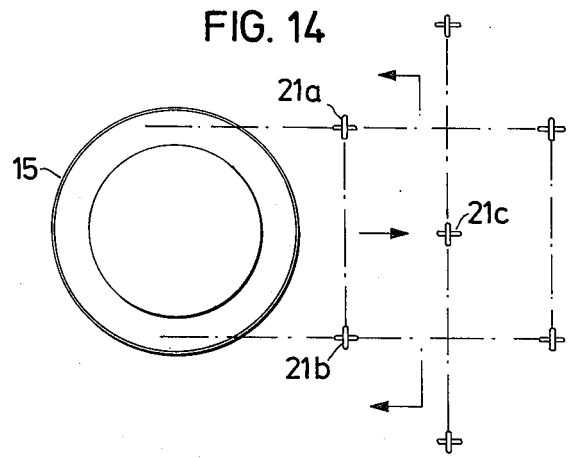
FIG. 14 is a view from above of the cup reposing on its bottom end in position for passing in between two tipping means in a transverse row of tipping means in the third zone and to engagement with a tipping element in the subsequent row of tipping means.
Figure 15:
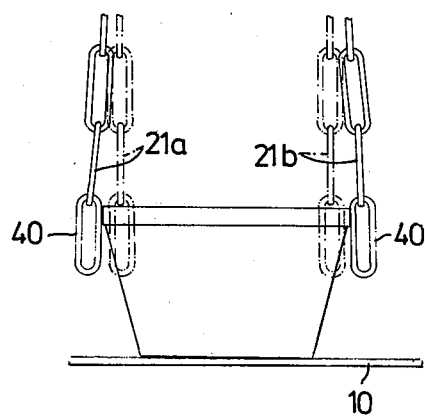
FIG. 15 is a view seen from the front of the cup in FIG. 14, the two tipping means being shown with full lines in their position of rest before they are met by the cup and by chain-dotted lines when the elements are swung out by the cup and glidingly engaged with its opposite sides at the upper end portion of the open end of the cup.
Figure 16:
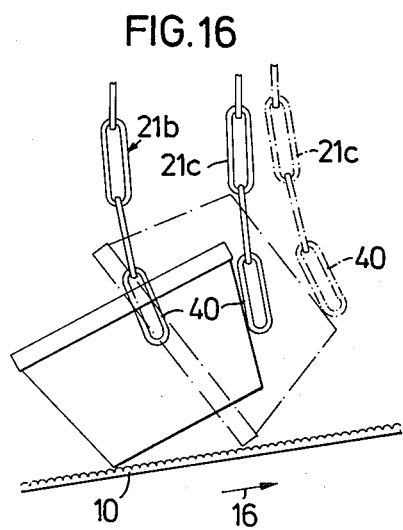
FIG. 16 is a side view of the cup in FIG. 15 when the tipping elements are in engagement with the side of the cup at its upper open end and have lifted the cup to an inclined position in cooperation with the frictional force of the belt against the bottom end of the cup, a further intermediate position being shown by chain-dotted lines to show how subsequent tipping elements coact with the two first-mentioned tipping elements to tip the cup into a position where it reposes on its open end.

As may be seen from the figures, especially FIGS. 11 and 14, there are a plurality of transverse rows of tipping means or chains, there being about ten rows in the example illustrated. Distribution of the chains is adapted to the height and width at both the open end and the bottom end of the cup in question. In principle, the tipping means is so made and arranged, that if the cup is reposing on its bottom end, it will be pressed in between two chains in a row, the contact points of the chains against the sides of the cup forming a yielding stop. How such a cup is affected by the chains is shown schematically in FIGS. 13 to 16.

From FIG. 13 it may be seen that a cup 15 reposing on its open end will remain in this position, since the chains glide over the bottom end of the cup and past the sides of it.

FIG. 14 shows how a cup reposing on its bottom end comes against two chains 21a, 21b in the first row of chains for example. The distance between the two chains 21a and 21b is less than the greatest diameter of the cup at its open end, but greater than the diameter of the cup at its bottom end, as may be seen from FIG. 14. When the cup is fed in between chains 21a, 21b the lowest links 40 of the chains will be swung outwards as shown with full lines in FIG. 15, engaging thereby with a yielding pressure against the edge of the open end of the cup. This causes the chain links to tilt the cup, since the lower end of the cup is driven forward by the conveyor 10. Friction between the chain links 40 and the edge of the cup is comparatively small, which means that the cup can turn without notable resistance at the points of contact with the chain links, which thereby function as sliding abutments for the cup.

About the same time as the chains 21a and 21b are being swung outwardly by the cup, the chain 21c in the second row of chains comes into contact with the upper edge of the cup. The second row of chains lies at a distance after the first which is less than the greatest diameter of the cup. As the cup is fed forward, the third chain 21c is swung successively backwards as shown schematically in FIG. 16. This third chain 21c thus effects the cup with a yielding force which also strives to tip the cup, and therefore coacts effectively with the force from the two chains 21a, 21b. In practical tests, it has been found that the three chains 21a, 21b, 21c ensure with great reliability that a cup reposing on its bottom end is turned over to a position where it reposes on its open end.

Even if tipping means other than chains can be used within the scope of the invention to act on the cups in the way set forth above, it has been found so far that the chains, constituting a comparatively simple aid, give the best result.

The number of chain rows is preferably comparatively large, in the order of magnitude of ten, to obtain a satisfactory degree of reliability for turning most of the cups reposing on their bottom ends to a position where they rest on their open ends.

The guiding means 23, 27 and rotating tipping means or rollers 25, 28 of the fourth and fifth zone are made in essentially the same way, for which reason only the guiding means 23 and the roller 25 will be described in more detail.

The guiding means 23 and its edge 24 extend obliquely over the belt 10 from the left hand side wall 41 of the conveyor, and has its further end 42 situated at a distance from the right hand side wall 43 of the conveyor which is at least equal to double the diameter of the open end of the cup, so that two cups abreast can pass through the space between the further end 42 of the guiding means and the side wall 43 as shown in FIG. 10.

Figure 17:
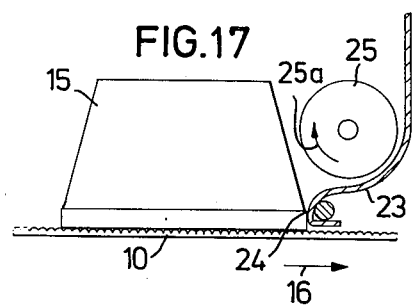
FIG. 17 is a cross section through a tipping means in the form of a rotating roller and a guiding means in a fourth and fifth zone, the cup reposing on its open end and not being affected by the rotating roller but is only being guided along by the guiding means so that the cups will align themselves.

The peripheral speed of the roller 25 should suitably be at least as large as the speed of the conveyor 10. In relation to the engaging end 24 of the guiding means 23, the roller 25 is in such a position that when a cup reposing on its open end according to FIG. 17 knocks against the engaging edge 24, the side of the cup would be free from the roller whereat the cup slides and rolls along the engaging edge.

On the other hand, if a cup is reposing on its bottom end according to FIG. 18, the position of the roller 25 is such that the cup knocks against the roller 25 but not against the engaging edge 24. The conveyor belt thereby presses the cup against the rotating roller 25 which has a rubber-like surface so as to make good frictional contact against the cup so that the cup is lifted by the roller and turned over onto its open end, the engaging edge 24 being located so that it does not hinder tipping.

The roller 25 is driven by a wheel 44 mounted in the framework of the apparatus and lying in driving engagement with the conveyor belt 10. A similar wheel 45 drives the roller 28.

The guiding means 23 and 27 respectively form an angle with the longitudinal direction of the conveyor which suitably lies between 35° and 45°.

The first guiding means 23 has the task of lining up as many cups as possible after each other in a row, but if high feed speed is desired for a conveyor with limited width, it is necessary to transfer the cups to another guiding means such as the guiding means 27. Cups which may be still reposing on their bottom ends are here turned to a position reposing on the open end by means of the roller 28, and most of the cups will be sorted up in a row one after the other.

At the end of the guiding means 27, its engaging edge 24 is extended with a guiding rail 46, FIG. 10, which is so arranged that cups reposing on their open ends engage with this guiding rail 46 and are guided in a path freely past the first flange 30 of the roller, while cups in a lying position or reposing on the bottom ends do not have contact with the guiding rail 46 and therefore make contact with the rotating flange 30 and are thrown out by this onto the return trough 32.

Under the flange 31 there is a second guiding rail 33a forming an extension of the guiding rail 33, to guide the cups reposing on their open ends into a free path between the flanges 30, 31 of the roller 29.

Figure 20:
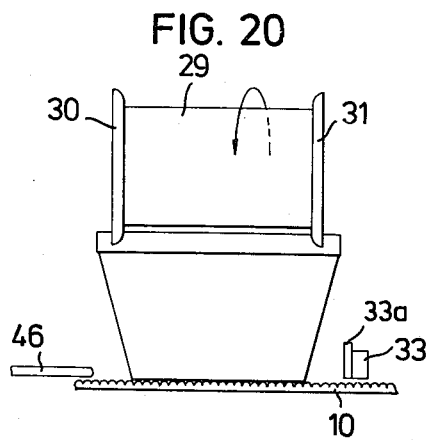
FIG. 20 shows the apparatus in FIG. 19 seen from the front.
Figure 21:
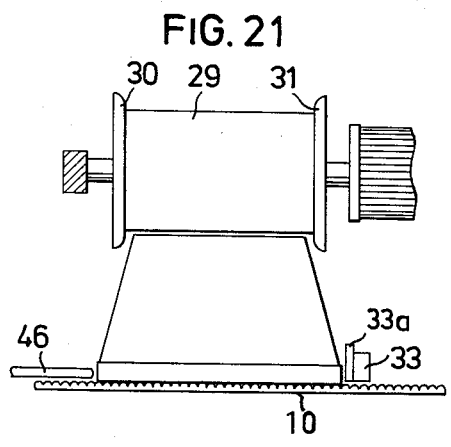
FIG. 21 shows the same apparatus as in FIG. 20 but with a cup reposing on its open end and guided by fixed guiding means in the vicinity of the conveyor belt, the upwardly turned bottom end of the cup being able to pass between the flanges of the roller with a comparatively small amount of play to the roller.
Figure 22:
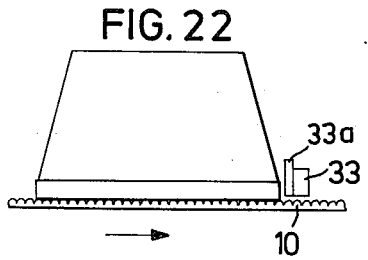
FIG. 22 shows a cup reposing on its open end and in engagement with an obliquely directed guiding rail after the rejection device, so that the cup can roll off against the rail.

As may be seen from FIGS. 6 and 20, the height of the roller 29 above the belt 10 is only somewhat larger than the height of a cup which reposes freely on the belt on its open end. If one cup is hooked over the handle of another cup, the upper edge of the cup will be at such a height over the belt that the cup will not go freely under the roller but knocks against it and is thrown out into the trough 32.

After the roller 29 there are only cups reposing on their open ends. These cups are passed one after another in a row along the guiding rail 33, which suitably forms a somewhat more acute angle in the range from 30° to 35°, with the longitudinal direction of the conveyor, to facilitate a desired rolling of the cup against the rail 33 when the cups have handles as shown in the examples in FIG. 10.

The cups normally roll against the rail 33 so that they all have their handles turned forward and in the direction of movement of the conveyor. However, it can occur that a cup is prevented from rolling freely because its handle is locked by the lift or handle of a subsequent cup. This faulty position is corrected in a simple manner by providing the engagement surface of the rail 33 along a length of the rail with a surface 47 having greater friction. The locked cup therefore obtains, according to the above, greater friction in this area and is thus turned with a greater force than the subsequent cup before this reaches the friction surface 47. The cup is hereby capable of turning itself free from its caught-up position with the handle of the subsequent cup, further ensuring that all cups have the handle in right position when they arrive at the stacking chute.

What I claim is:

1. An apparatus for turning and stacking a plurality of cups each having a tapered side wall extending between a closed bottom end and an open top end, the open end being of greater diameter than the closed end to facilitate stacking, the height of the cups being less than said greater diameter, said apparatus being characterized by comprising a conveyor belt for receiving the cups in a first zone where the cups arbitrarily assume one of three main positions upon the belt, namely: reposing on their bottom ends, reposing on their open ends or lying on one side; said belt being wide enough in the direction transverse to the direction of movement of the belt to support a plurality of cups across the width of the belt; means for moving the conveyor belt so that the belt passes through a zone downstream relative to said first zone provided with resilient lifting means extending across the width of the belt and having their free ends extending generally downward and toward the belt and arranged a spaced distance above the belt, said distance being less than said greater diameter and greater than said height so as to act only on those cups lying on their sides and to preferably erect those cups to a position of repose on their open ends, while the cups reposing on either their bottom or open ends pass freely through the second zone without engaging the lifting means; the belt being moved through a zone downstream relataive to the zone containing said lifting means provided with first moving tipping means which are arranged transverse to the movement of the belt to tip the cups from a position where they repose on their bottom ends to a position where they repose on their open ends, said first tipping means further including a guiding edge for slidably engaging only those cups reposing on their open ends to prevent the tipping means from engaging cups reposing on their open ends; and guiding means arraanged after said zones for leading the cups to a rejecting apparatus arranged above the conveyor belt which is adapted to remove all cups from the conveyor belt which assume a position other than having their open ends reposing on the conveyor belt.

2. An apparatus according to claim 1, characterized by the lifting means comprising a plurality of brush-like bristles.

3. An apparatus according to claim 2, characterized by the lifting means covering an area with an extension in the longitudinal direction of the conveyor which is at least twice the diameter of the cup at the open end of the cup.

4. An apparatus according to claim 1, characterized by providing second tipping means comprising a carrier positioned above the conveyor and a plurality of chains suspended from said carrier.

5. An apparatus according to claim 4, characterized by said chains having their lower ends situated in an area lying at a height above the conveyor belt which is approximately equal to two thirds the height of a standing cup.

6. An apparatus according to claim 1, characterized by comprising second tipping means including swingable members distributed in at least two consecutive transverse rows in the longitudinal direction of the conveyor; that the mutual distance between individual swingable members in the same row and the distance between the rows, respectively, is less than the greatest diameter at the open end of the cups and that swingable members in a subsequent row are essentially opposite the space between the individual swingable members in the immediately preceding row, seen in the direction of belt movement.

7. An apparatus according to claim 1, characterized by of the guiding edge of said tipping means being adjacent to the conveyor belt, extending obliquely over it from one side of the conveyor belt and having its further end situated at a place lying at a distance from the other side of the conveyor belt to allow those cups which wander along the guiding edge and leave its further end pass further downstream along with the conveyor belt.

8. An apparatus according to claim 7, characterized by the spacing between the further end of said edge and a side wall arranged at the edge of the conveyor being at least twice the greatest diameter of the open end of a cup so that two cups abreast can pass through said space.

9. An apparatus according to claim 7, characterized by providing a second guiding edge lying after the first guiding edge, the second edge extending downstream from the area after the space between the further end of the first guiding edge and the side wall of the conveyor obliquely over the belt for delivering the cups to a space between the further end of the second guiding edge and the adjacent edge of the belt.

10. An apparatus according to claim 7 characterized by providing an engagement portion of the first guiding edge a rotatable tipping roller having its axis of rotation parallel with the engagement portion of the guiding edge and in such position in relation to a vertical plane through the guiding edge engagement portion that a cup reposing on its open end lies in contact with the engagement portion of the guiding edge but its sidewall is prevented from making contact with the tipping roller, while a cup reposing on its bottom end makes contact with the tipping roller but not with the guiding edge, and is actuated by frictional engagement with the rotating roller to move in a direction to tip over to a position where it reposes on its open end.

11. An apparatus according to claim 7, characterized by said first tipping means including a rotatable tipping roller; a driving motor for driving the conveyor belt and rotating the tipping roller, the peripheral speed of the tipping roller being so selected that it is at least as great as the speed of the conveyor belt.

12. An apparatus according to claim 7, characterized by providing a rejecting apparatus in the shape of a rotating throw-off roller after at least one of the guiding edges, the height of the roller over the belt being slightly greater than the height of a cup reposing freely on the belt; the guiding means being arranged to lead the cups reposing on their open ends freely under the roller, while cups in all other positions are not affected by the guiding means and are allowed to come into contact with the roller for being pushed off the adjacent edge of the conveyor belt.

13. An apparatus to claim 12, characterized by the roller having a flange at each end, the distance between the flanges being less than the diameter of the open end of the cup so that a cup reposing on its bottom end cannot pass between the flanges, said spacing being sufficient to permit the free passage of a cup having its bottom end turned upwards.

14. An apparatus according to claim 12, characterized by said cups having outwardly extending handles and the free height in the gap between the roller and the conveyor belt being less than the height which is obtained for a cup with its open end downwards but lying with its edge on the handle of an adjacent cup which reposes on its open end.

15. An apparatus according to claim 12, characterized by providing a guiding rail extending obliquely over the belt and being positioned downstream relative to the rejecting apparatus, to lead the cups reposing on their open ends in a row after each other towards a stacking device arranged near the end of the conveyor, the obliqueness of the guiding rail in relation to the longitudinal direction of the belt being such that the cups roll against the guiding rail substantially about a vertical axis, which results in cups provided with handles rolling against the rail until the handles engage the rail and thus are all aligned in the same direction when they are delivered to the stacking apparatus.

16. An apparatus according to claim 1, characterized by the conveyor belt being upwardly inclined in its direction of movement to aid in causing those cups lying on their sides in the first zone to strive to assume a position with their bottom ends turned towards the lifting means provided in the zone following said first zone.

17. An apparatus according to claim 1, characterized by the surface of the conveyor belt being of rubber-like material and having corrugations forming transverse closely adjacent ridges to enhance the frictional grip exerted on the cups by the belt.

18. An apparatus for lining up stackable cups made with a handle at the open end of the cup in such a way that the cups can be transferred to a stacking apparatus in the form of a stacking chute or a stacking tube from a position where they repose on their open ends and with their handles directed in the same direction, in accordance with the apparatus of claim 1, characterized by the guiding means comprising a rail which is arranged obliquely to the belt so that the cups reposed on their open ends on the conveyor belt are moved into engagement with the guiding rail and frictionally engage the guiding rail and are forced to rotate generally about a cup vertical axis against the guiding rail until the handles engage the guiding rail and are turned towards the further end of the guiding rail where they are intended to be delivered to the stacking apparatus.

19. An apparatus according to claim 18, characterized by the guiding rail having an area with less friction than the area initially engaged by the cups and a subsequent area having larger friction so that the cups are exposed to a greater turning force on contact with the engagement surface having the larger friction.

20. Apparatus for turning and stacking a plurality of cups, said cups having a tapering side wall extending between a closed bottom end and an open top end, the open end being of greater diameter than the closed end to facilitate cup stacking, said apparatus comprising:

a conveyor belt movable in the first direction and having a width adapted to accommodate a plurality of cups there across;

tipping means obliquely arranged across the width of the conveyor belt;

an upright side wall extending along one edge of said conveyor belt, the downstream end of said tipping means converging toward said side wall and having its downstream end positioned a spaced distance from said side wall greater than said greater diameter;

said tipping means comprising a substantially straight guide edge positioned immediately above the surface of the conveyor belt moving said cups;

elongated rotatable tipping means positioned above said guide edge and extending beyond said guide edge toward the upstream direction by an amount sufficient so that cups reposing on the conveyor belt on their open ends are prevented from engaging the tipping means while cups reposing in any other position including that in which the cups are reposing on their closed bottom end are caused to engage the tipping means;

the surface of said rotating tipping means making frictional engagement with the cups sufficient to tip the cups into a position where they repose upon the conveyor belt on their open top ends so that preferably only cups having their open top ends reposing upon the surface of the conveyor belt pass beyond the downstream end of the tipping means.

21. The apparatus of claim 20 further comprising second tipping means similar to said first tipping means arranged obliquely across the conveyor belt so that the upstream end is positioned adjacent said upright side wall and the downstream end extends toward the opposite edge of the conveyor belt thereby imposing a second tipping action upon the moving cups to further insure that substantially all of the cups are moved to the desired position reposing on their top open ends.

* * * * *